Dec. 17, 1968     O. R. WEBER     3,416,292
APPARATUS FOR MAKING COVERED RECEPTACLES OR THE LIKE
Original Filed Aug. 18, 1964     2 Sheets-Sheet 1
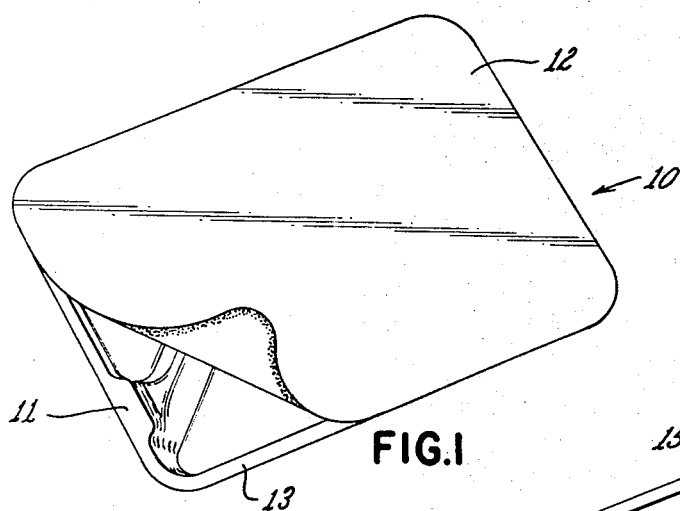
FIG.1
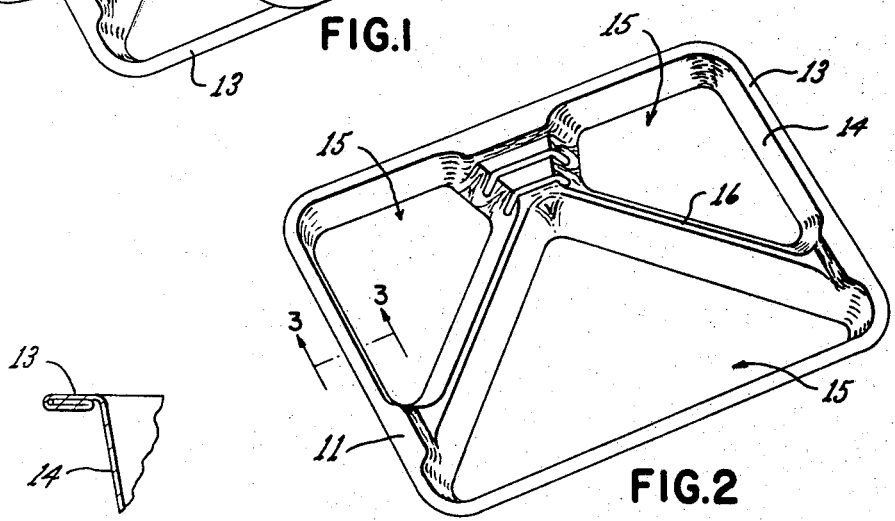
FIG.2
FIG.3
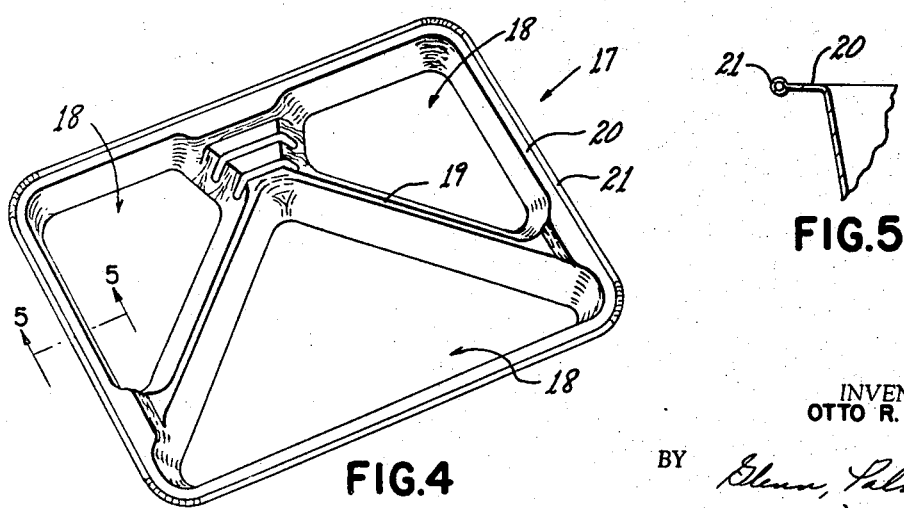
FIG.4
FIG.5
INVENTOR.
OTTO R. WEBER
BY
HIS ATTORNEYS Dec. 17, 1968     O. R. WEBER     3,416,292
APPARATUS FOR MAKING COVERED RECEPTACLES OR THE LIKE
Original Filed Aug. 18, 1964     2 Sheets-Sheet 2
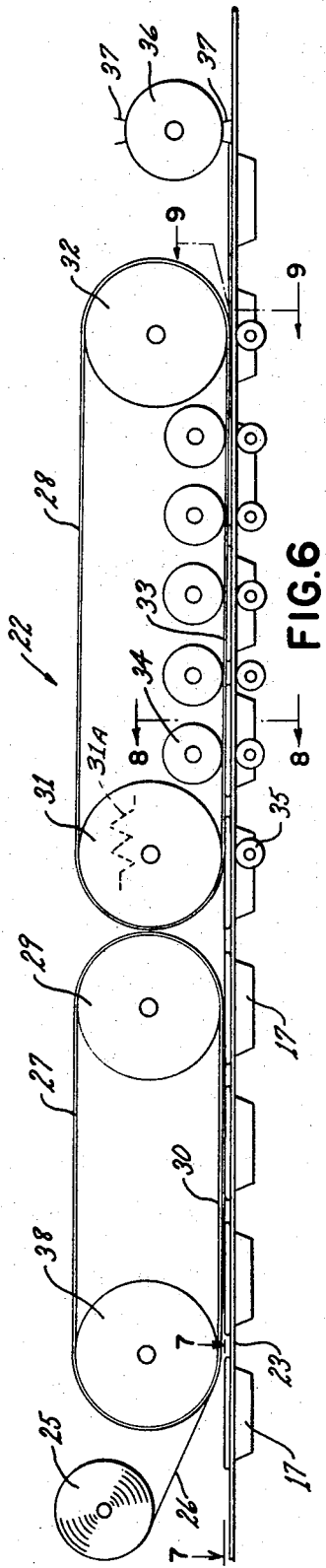
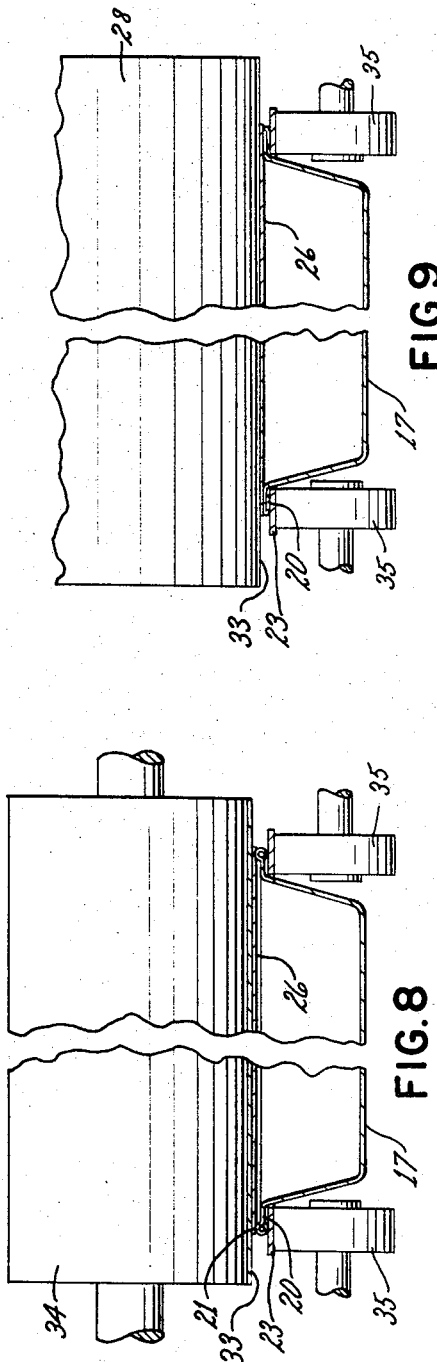
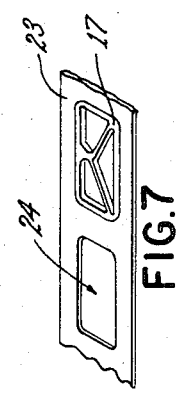
INVENTOR.
OTTO R. WEBER
BY Glenn, Palmer & Matthews
HIS ATTORNEYS

United States Patent Office 3,416,292
Patented Dec. 17, 1968

3,416,292
APPARATUS FOR MAKING COVERED
RECEPTACLES OR THE LIKE
Otto R. Weber, Richmond, Va., assignor to Reynolds
Metals Company, Richmond, Va., a corporation of
Delaware
Original application Aug. 18, 1964, Ser. No. 390,295.
Divided and this application Jan. 6, 1967, Ser. No.
621,374
7 Claims. (Cl. 53—329)

ABSTRACT OF THE DISCLOSURE

This disclosure relates to a method and apparatus for continuously securing cover means to the upper peripheral flange means of open top receptacles as the receptacles are continuously being fed along a path with the cover means, the securing means being continuously moved over and along with the cover means to secure the cover means to the peripheral flanges of the receptacles and including a continuous orbiting belt means being heated to heat seal the cover means to the receptacles at the peripheral flanges thereof or providing pressure means for pressing a pressure adhesive side of the cover means against the peripheral flanges of the receptacles.

---

This application is a divisional patent application of its parent patent application, Ser. No. 390,295, filed Aug. 18, 1964, now abandoned, and assigned to the same assignee that this application is assigned.

This invention relates to an improved covered receptacle as well as to an improved method and apparatus for making such a covered receptacle or the like.

It is well known that food products and the like, such as complete dinners, are placed in various compartment means of a metallic foil receptacle so that the filled receptacle can be subsequently covered by a suitable covering material in order to permit the product to be merchandised, the contents of the receptacle either being frozen or remaining at room temperature as desired.

However, before this invention, no satisfactory means have been provided for hermetically sealing the cover member to the aforementioned receptacle to maintain a vapor proof construction whereby flavor loss, spoilage and the like are held to an absolute minimum.

According to the teachings of this invention, however, an improved covered receptacle of the above type is provided wherein the cover member is adapted to be hermetically sealed to the filled receptacle by the method and apparatus of this invention.

Accordingly, it is an object of this invention to provide an improved covered receptacle having one or more of the novel features of this invention as set forth above or hereinafter shown or described.

Another object of this invention is to provide an improved method for providing such a covered receptacle or the like.

A further object of this invention is to provide an improved apparatus for making such a covered receptacle or the like.

Other objects, uses and advantages of this invention are apparent from a reading of this description which proceeds with reference to the accompanying drawings forming a part thereof and wherein:

FIGURE 1 is a top perspective view of the improved covered receptacle of this invention with a portion of the cover member thereof peeled open.

FIGURE 2 is a top perspective view of the uncovered receptacle of FIGURE 1.

FIGURE 3 is an enlarged, fragmentary, cross-sectional view taken on line 3—3 of FIGURE 2.

FIGURE 4 is a view similar to FIGURE 2 and illustrates another covered receptacle of this invention.

FIGURE 5 is an enlarged, fragmentary, cross-sectional view taken on line 5—5 of FIGURE 4.

FIGURE 6 is a schematic side view illustrating one embodiment of the method and apparatus of this invention for covering the receptacles illustrated in FIGURES 1 and 4.

FIGURE 7 is a fragmentary, top perspective view taken substantially on line 7—7 of FIGURE 6.

FIGURE 8 is an enlarged, fragmentary, cross-sectional view taken substantially on line 8—8 of FIGURE 6.

FIGURE 9 is a view similar to FIGURE 8 and is taken substantially on line 9—9 of FIGURE 6.

While the various features of this invention are hereinafter described and illustrated as being particularly adaptable to form a covered receptacle or the like, it is to be understood that the various features of this invention can be utilized singly or in any combination thereof to provide other devices as desired.

Therefore, this invention is not to be limited to only the embodiments illustrated in the drawings, because the drawings are merely utilized to illustrate one of the wide variety of uses of this invention.

Referring now to FIGURE 2, an improved covered receptacle of this invention is generally indicated by the reference numeral 10 and comprises a metallic foil receptacle 11 having a metallic foil cover member 12 secured thereto around a peripheral flange 13 of the receptacle 11 in a manner hereinafter described.

However, it is to be understood that the particular material forming the receptacle 11 and cover member 12 of this invention can be varied, as desired, and that this invention is not to be limited to any particular material.

As illustrated in FIGURE 2, the receptacle 11 of this invention can be drawn, stamped or otherwise formed from a sheet of metallic foil, such as aluminum-containing metallic foil or the like to form the same into an open ended configuration having the outer peripheral wall 14 thereof surrounded by an outwardly directed substantially horizontal flange 13 which is substantially flat throughout the width thereof as illustrated in FIGURE 3.

The receptacle 11 can be divided into a plurality of compartment means 15 by suitable divider means 16 of the receptacle in a conventional manner whereby different food products can be disposed in the differently shaped compartments 15 in the conventional manner.

Thereafter, the cover member 12 is provided for the receptacle 11 and either the under side of the peripheral edge of the cover member 12 or the upper surface of the peripheral flange 13 of the receptacle 11 or both are provided with heat sealing means, such as a coating of polyethylene or the like whereby the peripheral edge of the cover member 12 can be subsequently hermetically heat sealed to the peripheral flange 13 of the receptacle 11 in a manner hereinafter set forth to provide a hermetically sealed construction 10 as illustrated in FIGURE 1.

Alternately, the receptacle of this invention can be formed in the manner illustrated in FIGURES 4 and 5 and generally indicated by the reference numeral 17.

As illustrated in FIGURES 4 and 5, the receptacle 17 is formed in a conventional manner from a sheet of aluminum-containing metallic foil or the like to define an open ended receptacle having compartment means 18 defined by divider means 19 in the manner similar to the receptacle 11. However, the receptacle 17 is provided with the conventional outwardly directed peripheral flange 20 which terminates as its outer edge into a conventional curled bead 21 normally being utilized to add rigidity to the peripheral flange 20 of the receptacle 17, the curled bead 21 having a cross-sectional thickness substantially greater than the cross-sectional thickness of the flange 20.

However, it has been found that when the conventional receptacle 17 is formed in the conventional manner, the same can be utilized according to the teachings of this invention to permit a cover member, similar to cover member 12, to be hermetically sealed to the peripheral flange 20 thereof to perform the functions of this invention.

For example, it has been found that the peripheral curled bead 21 of the receptacle 17 can be subsequently flattened to provide a flat surface to be heat sealed to the peripheral edge of the cover member 12 in a manner now to be described.

As illustrated in FIGURE 6, the improved method and apparatus of this invention for forming the covered receptacles of this invention is generally indicated by the reference numeral 22.

The apparatus 22 of this invention includes a continuously moving conveyor belt 23 having a plurality of substantially rectangular openings 24 passing therethrough in aligned relation as illustrated in FIGURE 7 whereby the receptacles 11 or 17 of this invention can be serially placed into the openings 24 and be suspended therein by having the peripheral flanges 13 or 20 thereof resting on the upper side of the conveyor belt 23.

As the receptacles 11 or 17 are being serially fed into the pockets 24 of the conveyor belt 23 in any suitable manner, the same can be previously filled with the desired product or the desired product can be disposed in the compartment means thereof as the inserted receptacles 11 or 17 are being passed through the apparatus 22, as desired.

The filled receptacles 11 or 17 are adapted to pass through the apparatus 22 from left to right in FIGURE 6 and are adapted to serially have the cover members 12 hermetically sealed thereto to provide the covered receptacles of this invention.

In particular, a free wheeling supply roll 25 of cover material 26 is provided whereby a length of the cover material 26 can be fed from the supply roll 25 through the apparatus 22.

The cover material 26 and receptacles 11 or 17 are adapted to pass through the apparatus 22 in unison beneath a pair of serially aligned and orbiting belt means 27 and 28.

For example, the belt means 27 can be looped around a pair of rollers 38 and 29 which, when driven in the proper direction, causes the belt means 27 to orbit in a counterclockwise direction whereby the lower run 30 of the belt means 27 moves along over the strip of cover material 26 and the receptacles 11 or 17 as the same pass through the apparatus 22.

It is preferred that the belt means 27 and 28 of this invention be formed of heat conductive material, for example the belt means 27 and 28 can be made of steel or the like.

In this manner, the belt means 27 and 28 can be utilized to heat not only the cover material 26 as the same passes through the apparatus 22 but also the peripheral flanges 13 or 20 of the receptacles 11 or 17 as they pass through the apparatus 22 to perform a heat sealing operation in a manner hereinafter described.

In particular, either the roller 38 or 29 or both can be heated by electrical means or other means as desired to substantially heat the belt means 27 so that the same will subsequently pre-heat the cover material 26 and receptacles 11 or 17 as they pass through the apparatus 22.

Preferably, the lower run 30 of the belt means 27 is so constructed and arranged that the same merely engages the heated material 26 as it passes through the apparatus 22 without placing any pressure on the peripheral flanges 13 or 20 of the receptacles 11 or 17 as they pass through the apparatus 22.

In order to provide tension on the belt means 27 as well as to adjust the same relative to the sheet of material 26, one or both of the roller means 38 and 29 is movable vertically upwardly and horizontally toward and away from the other roll to provide for adjustment of the belt means 27 in the apparatus 22.

Similarly, the belt means 28 is disposed around a pair of other rotatable rolls 31 and 32 adjustable both vertically and horizontally to maintain tension on the belt means 28.

However, the rollers 31 and 32 of the belt means 28 are so constructed and arranged that the lower run 33 of the belt means 28 is disposed at an angle relative to the conveyor means 23 so that as the cover material 26 and receptacles 11 or 17 pass beneath the lower run 33 of the belt means 28, the same continuously places greater pressure on the cover means 26 to effectively dispose the same against the peripheral flanges 13 and 20 of the receptacles 11 or 17 as they pass the belt means 28.

When the receptacles 17 are passing through the apparatus 22, it can be seen that the curled beads 21 thereof effectively pass under the run 33 of the belt means 28 at the roller means 31 thereof.

However, as the particular receptacle 17 continuously passes under the belt means 28, the spacing between the run 33 of the belt means 28 and the conveyor means 23 gradually diminishes whereby the belt means 28 effectively flattens the curled bead 21 of the particular receptacle 17 as it passes through the apparatus 22 in the manner illustrated in FIGURES 6, 8 and 9 to not only provide a flat surface to which the cover material 26 can be attached, but to also effectively heat seal the cover material 26 to the peripheral flange 20 of the receptacle 17.

In order to aid this flattening effect of the lower run 33 of the belt means 28, a plurality of rollers 34 can be disposed between the roller means 31 and 32 of the belt means 28 in the manner illustrated in FIGURE 6 to effectively flatten the beads 21 of the receptacle 17 as they pass through the apparatus 22.

In order to back up this flattening operation of the belt means 28, a plurality of roller means 35 can be disposed below the conveyor means 23 to back up the conveyor means 23 at the bead means 21 of the receptacle 17 so that the beads 21 of the receptacle 17 can be flattened in the manner previously described.

In order to effect the heat sealing of the material 26 to the peripheral flanges 13 or 20 of the receptacle 11 or 17, the belt means 28 is effectively heated by one or more of the roller means 31, 32, 34, as desired, such as by an electrical heater 31A disposed therein, to substantially heat the belt means 28 to perform its heat sealing operation.

Therefore, it can be seen that since the sheet of material 26 is effectively secured to each receptacle 11 or 17 as it passes from the right from beneath the roller 32 of the belt means 28, the sheet of material 26 can be drawn through the apparatus 22 from the supply roll 25 thereof in a continuous manner as long as the conveyor means 23 continues to move from left to right through the apparatus 22.

If desired, the apparatus 22 can include a suitable cutting means 36 disposed to the right of the belt means 28 which has cutting knives 37 thereon which will positively separate the sheet of material 26 between the individual receptacles 11 or 17 as they pass under the rotating cutting means 36 whereby the resulting cover members 12 are produced after the same have been secured to the receptacles 11 or 17.

Subsequently, the completed covered receptacles can be removed from the conveyor means 23 in any suitable manner as desired.

While the apparatus 22 illustrated in the drawings is shown securing the cover members 12 to the receptacle 17 of this invention, it is to be understood that the apparatus 22 of this invention can be suitably utilized to secure the cover members 12 to the receptacles 11 of this invention, if desired, whereby the belt means 28 will provide the heat sealing operation in the manner previously described without requiring the belt means 28 to flatten a bead on each receptacle 11 in the manner previously described.

Also, while this invention has heretofore been described in connection with a cover member that is heat sealed to the peripheral flange of the receptacle, it is to be understood that the various features of this invention are also applicable to cover members secured to the receptacles by other adhesives or the like.

For example, it has been found that a pressure sensitive adhesive can be applied to the bottom of the cover member whereby the cover member can be hermetically sealed to the receptacle by the apparatus and method of this invention without utilizing a heat sealing operation.

It has been found that when the pressure sensitive adhesive has been utilized and the resulting covered receptacle is refrigerated to maintain the frozen condition of the food therein, the pressure sensitive adhesive maintains the hermetic seal between the cover member and the receptacle whereby the securement therebetween is enhanced. However, when the covered receptacle is heated during the cooking of the food therein by the ultimate consumer, the pressure sensitive adhesive is affected in such a manner that the cover member can be readily and easily peeled from the receptacle.

One type of pressure sensitive adhesive that has been found to have the above properties is utilized on the back of Dennison Press-a-ply file folder labels.

While the pressure sensitive adhesive can be utilized in the above manner with a foil receptacle that has previously been coated with stearic acid to enhance the drawing qualities of the foil sheet into the receptacle, it has been found that the pressure sensitive adhesive functions much better when the foil sheet has been coated with oleic acid or an ester of oleic acid in the manner fully set forth and claimed in the copending patent application, Ser. No. 390,296 filed Aug. 18, 1964 (now abandoned) because the stearic acid acts as a release agent whereas the oleic acid and ester of oleic acid does not have this undesirable property.

Therefore, it can be seen that not only does this invention provide an improved covered receptacle having many advantages over prior known covered receptacles, but also this invention provides an improved method and apparatus for making such a covered receptacle or the like.

While the form of the invention now preferred has been disclosed as required by the statutes, other forms may be used, all coming within the scope of the claims which follow.

What is claimed is:

1. Apparatus for covering receptacles each having a continuous flat peripheral flange at the upper open end thereof terminating at a curled bead that has a top surface non-coplanar with the top surface of said peripheral flange, said apparatus comprising conveyor means for serially feeding said receptacles along a path, means for feeding cover means along said path over compartment means of said receptacles, securing means, and means for continuously moving said securing means over and along with said cover means to secure said cover means to said upper flat peripheral flanges of said receptacles, said securing means having means cooperating with said conveyor means to change the condition of said beads of said receptacles so that said top surfaces of said beads are co-planar with the top surfaces of the respective peripheral flanges while securing said cover means at least to said top surfaces of said respective peripheral flanges.

2. Apparatus as set forth in claim 1 wherein said securing means includes a continuously orbiting belt means.

3. Apparatus as set forth in claim 2 and including means for heating said belt means to heat seal said cover means to said peripheral flanges of said receptacles.

4. Apparatus as set forth in claim 3 wherein said means for heating said belt means includes roller means around which said belt means orbits.

5. Apparatus as set forth in claim 1 and including roller means to back up said conveyor means beneath said securing means.

6. Apparatus as set forth in claim 1 wherein said conveyor means has a plurality of pockets therein which respectively receive said receptacles with each receptacle having the curled bead thereof resting on said conveyor means.

7. Apparatus as set forth in claim 1 wherein said cover means is a continuous sheet of material and including means for separating said sheet of material between said covered receptacles.

References Cited

UNITED STATES PATENTS

| | | | |
|---|---|---|---|
| 2,783,693 | 3/1957 | Felber | 53—39 X |
| 2,884,988 | 5/1959 | D'Angelo | 53—39 X |
| 2,958,168 | 11/1960 | Vogt | 53—184 X |
| 3,112,590 | 12/1963 | O'Brien | 53—373 X |
| 3,186,142 | 6/1965 | Borgardt et al. | 53—373 |
| 3,197,940 | 8/1965 | Spangler | 53—184 X |
| 3,210,910 | 10/1965 | Seefluth | 53—39 X |

FOREIGN PATENTS

| | | |
|---|---|---|
| 664,396 | 1/1952 | Great Britain. |

TRAVIS S. McGEHEE, *Primary Examiner.*

R. L. SPRUILL, *Assistant Examiner.*

U.S. Cl. X.R.

53—373